May 12, 1953 R. C. WEBSTER 2,637,997

FLOWMETER FOR OXYGEN TANKS

Filed Aug. 15, 1949

INVENTOR.
Raymond C. Webster
BY
ATTORNEY.

Patented May 12, 1953

2,637,997

UNITED STATES PATENT OFFICE 2,637,997

FLOWMETER FOR OXYGEN TANKS

Raymond C. Webster, Kansas City, Mo., assignor to W. E. Anderson, Inc., Kansas City, Mo.

Application August 15, 1949, Serial No. 110,270

3 Claims. (Cl. 73—230)

This invention relates to an instrument particularly adaptable for use in hospitals to determine with accuracy and without computation the amount of oxygen or other fluids administered to patients, the primary object being to provide a flowmeter that is accurate, easily read, inexpensively manufactured and not likely to become maladjusted or in need of repair over long periods of use.

It is the most important object of the present invention to provide a flowmeter capable of measuring with accuracy the precise amount of oxygen administered to a patient and having a rotatable propeller within the path of flow of oxygen, mounted to eliminate friction almost entirely and to receive the full force of the oxygen as the same passes through a specially formed housing.

Another important object of the invention is the provision of a flowmeter for oxygen tanks and the like having a housing provided with an inlet and outlet opening and passageways therewithin, for controlling the flow of oxygen and causing the same to impinge upon the rotatable propeller evenly and in a balanced manner.

Other objects of the present invention include the way in which the propeller and its shaft are floatingly mounted and held suspended by the flow of oxygen itself; the way in which the amount of oxygen acting upon the propeller is controlled; the manner in which a by-pass is provided that in turn has control means whereby the meter may be compared with and set according to a suitable standard in an accurate manner; and other more minor objects, all of which will be made clear or become apparent as the following specification progresses.

Figure 1:
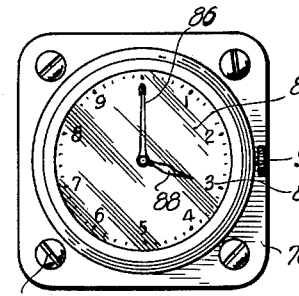
Fig. 1 is a top plan view of a flowmeter for oxygen tanks made in accordance with the present invention.

There is today an increasing demand by the medical profession generally, for an instrument adapted to be used with oxygen tanks and the like and capable of determining accurately the amount of oxygen that is administered to a particular patient.

As it well known, such oxygen is given to a patient in varying quantities under differing periods of time and intermittently. A given tank of oxygen may be used for many patients and several patients are oftentimes administered oxygen simultaneously from one or more tanks. Under present practices in hospitals and the like, there is virtually no way of determining precisely the amount of oxygen consumed by a particular patient. In instances where the amount used can be determined, considerable attention is needed, complicated book-keeping systems are used and valuable time and energy is expended by the doctors, nurses, laboratory technicians and the accounting department of the institution. In any event, disagreements still arise because of the charges for the oxygen not being accurate, resulting in dissatisfaction among patients generally.

As will hereinafter appear, the flowmeter hereof will eliminate all of the above problems and render it possible to charge patients in precise accordance with the amount of oxygen actually used over any period of time irrespective of how intermittently the same is given or how large the amount administered over a given period of time.

In the drawings there is illustrated a hollow housing broadly designated by the numeral 10. Housing 10 is shown to be polygonal in cross section but obviously may take any shape that may be desired. A bottom 12, and top 14, are substantially identical and formed into flat, plate-like members. A centermost plate 16, also of much the same character as walls 12 and 14 forms a partition between walls 12 and 14. A block 18 is interposed between the wall 12 and partition 16 and a ringlike member 20 is disposed between the partition 16 and the top wall 14 of housing 10.

Figure 3:
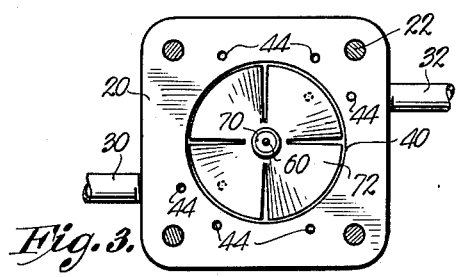
Fig. 3 is a transverse cross-sectional view taken on line III—III of Figure 2.
Figure 2:
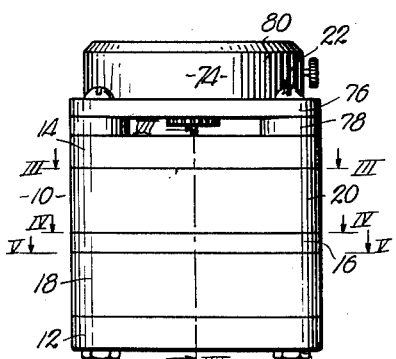
Fig. 2 is a side elevational view thereof.
Figure 4:
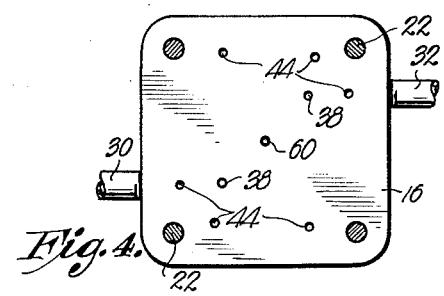
Fig. 4 is a transverse cross-sectional view taken on line IV—IV of Fig. 2.
Figure 5:
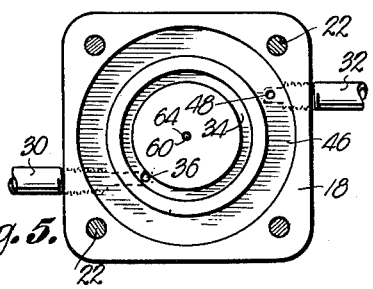
Fig. 5 is a transverse cross-sectional view taken on line V—V of Fig. 2.
Figure 6:
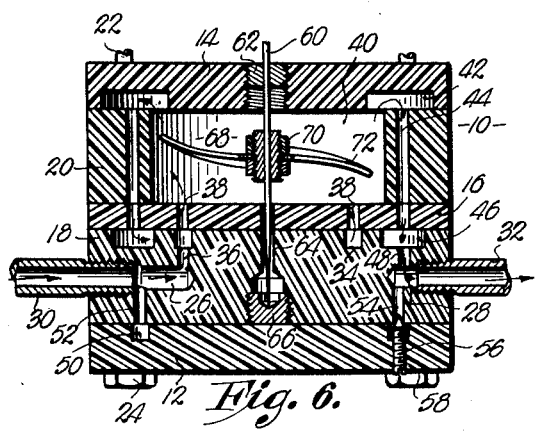
Fig. 6 is a substantially central, vertical cross-sectional view through the flowmeter assuming the inlet and the outlet openings to be diametrically opposed and in a central plane therethrough.
Figure 7:
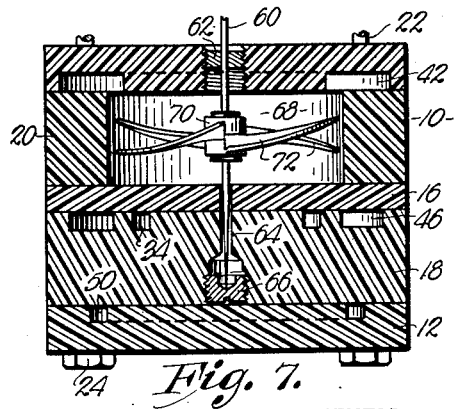
Fig. 7 is a substantially circular, vertical, cross-sectional view taken at right angles to the view shown in Fig. 6.

The various sections 12, 18, 16, 20 and 14 are therefore relatively superimposed and held together through the medium of a plurality of elongated bolts 22, each having a nut 24 thereon for maintaining the aforesaid sections of housing 10, releasably clamped together. It is understood that suitable gaskets may be interposed between the sections if desired, but if such sections are accurately formed, a fluidtight seal may be made without the use of such gasket elements. The block section 18 is provided with an internally-tapped inlet opening or passageway 26, and a similar outlet passage 28 in opposed relationship to inlet 26 and offset with respect thereto as is clear in Figs. 1 to 5 inclusive.

The conduit 30 threaded into inlet opening 26 couples with an oxygen tank or other fluid supply (not shown) and a conduit 32 threaded into outlet opening 28 is connected with the means for directing oxygen to a patient (not shown) and which may take the form of conventional devices of this character presently used. Block 18 has annular cavity 34 that is open at its top and that communicates directly with the inlet passageway 26 by a vertical port 36.

The partition section 16 has a pair of diametrically opposed vertical openings 38, that place the annular cavity 34 into direct communication with a hollow chamber 40 above partition 16 and defined by ring section 20.

The lowermost face of the top wall 14 has an annular open bottom cavity 42 that extends into overlapping relationship to the chamber 40 and therefore communicates directly therewith. Annular cavity 42 also communicates with a plurality of vertical passageways 44 formed in the housing sections 10 and 16 respectively. Passageways 44, in turn communicate with an annular cavity 46 that is open at its top and formed in block section 18, concentric with annular cavity 34. Cavity 46 registers directly with the outlet opening 28 by a short port 48. The bottom section 12 of housing 10 is provided with an open top annular cavity 50 that registers with the openings 26 and 28 by passages 52 and 54 respectively.

The bottom section 12 also has an internally taped opening 56 that registers with the passage 54 and receives a manually operable needle valve 58 that extends into passage 54. An elongated shaft 60 extends into the housing 10 and is rotatably mounted within a bearing 62 mounted in top wall 14. The innermost end of the shaft 60 is tapered and passes through an opening 64 formed in the housing sections 16 and 18. The lowermost end of the opening 64 mounts a bearing 66 for the relatively small inner end of shaft 60.

A propeller, broadly designated by the numeral 68, is mounted on the shaft 60 and disposed within the chamber 40. The propeller 68 has a hub 70, that is rigidly mounted on shaft 60 and a plurality of arcuate twisted radial vanes or blades 72.

The bolts 22 also serve to mount an indicating assembly 74 to the housing 10, base 76 of assembly 74 being half way from the top wall 14 of housing 10 by spacers 78.

Assembly 74, also includes a case 80, having a dial 82 thereon, that is graduated with suitable indicia 84. Pointer hands 86 and 88, not unlike those of an ordinary watch or clock sweep across the dial 82. When the flow meter is placed in use, hands 86 and 88 are operably connected with the shaft 60 through a train of reduction gearing, but since such gearing may well take the conventional form including, if desired, certain internal mechanisms of watches and clocks, the same has not been shown.

It is obvious that hand 88 may indicate given units of the fluid passing through housing 10 and that hand 86 may indicate fractions thereof in any manner desired. Furthermore, the dial 82 may be graduated in a manner differing from that illustrated in Fig. 1.

Reset means within the case 80, for the pointer hands 86 and 88, is actuated manually by a rotatable knob 90.

In operation, the flowmeter is interposed within the line of oxygen, or other fluids, passing from a supply thereof to a patient. The oxygen entering conduit 30 and inlet 26 will pass through port 36 into the collector cavity 34 and thence into the chamber 40 by way of opening 38. Such oxygen will impinge upon and cause rotation of propeller 68 and its shaft 60. The oxygen finds its outlet from housing 10, through a collector cavity 42, passageway 44, collector cavity 46, port 48, outlet opening 28, and thence through conduit 32. Propeller 68 is easily synchronized with the assembly 74 by means of the needle valve 58. Unless valve 58 is completely closed, a certain amount of the oxygen entering conduit 30 will pass through a port 52 into collector cavity 50 and thence escape into outlet 28 by way of port 54.

Obviously, the amount of oxygen that may bypass propeller 68 in this manner depends upon the extent of opening of the valve 58.

It is, therefore, simple to check the flowmeter with a suitable standard and to positively regulate the same to indicate the exact amount of oxygen by means of hands 86 and 88 that is used while the meter is in operation.

The shaft 60 is reciprocably mounted on the bearing 62 and the opening 64. It is understood that an elongated gear on that end of the shaft 60 within case 80 will permit reciprocation. Accordingly, as the oxygen enters chamber 40 it will effectively reduce the weight of the propeller assembly on the bearing 66.

The only friction present during normal operation is within bearing 62 and accordingly the accuracy of propeller 68 in connection with the assembly 74 is greatly enhanced.

Through use of the flowmeter, forming the subject matter hereof, it is a simple matter for any nurse, or untrained worker to read the dial 82 after each period of use thereof to determine the exact amount of oxygen that has been used for such limited period. No figuring of any kind is necessary and the dial 82 is easily read whereupon the reading thereof may be made of record in the case history of the particular patient using the oxygen or other fluid.

Manifestly, such details of construction as are capable of change or modification are contemplated by this invention, and it is therefore desired to be limited only by the spirit thereof as defined by the scope of the appended claims.

Having thus described the invention, what is claimed as new and desired to be secured by Letters Patent is:

1. In a flowmeter, a block provided with an inlet passageway, an opposed outlet passageway, a first annular cavity in the uppermost face thereof, a port connecting the first cavity with the inlet passageway, a second annular cavity in said face surrounding the first cavity, and a port connecting the second cavity with the outlet passageway; a center plate overlying the block and having a number of vertical openings therethrough communicating with the first cavity; a ring-like member overlying the center plate and presenting a propeller chamber; a top plate overlying the member and having a third annular cavity communicating with the chamber, said center plate and said member having a plurality of vertical passages interconnecting the second cavity and the third cavity, said block, said member and said plates being interconnected, presenting a unitary housing; and a propeller rotatably mounted in said chamber directly above said openings within the path of travel of pressurized fluid emanating from the latter, said passages surrounding the axis of rotation of the propeller in concentric relationship thereto.

2. In a flowmeter as set forth in claim 1 wherein is provided a vertical hole in the block and the center plate; a first bearing in said hole; a second bearing in said top plate; and a vertical shaft secured to the propeller and extending into the hole, said shaft having a pointed lowermost end adapted to rest on the first bearing and extending through the second bearing for vertical movement therein as the propeller is raised by the force of said fluid to move said pointed end off the first bearing.

3. In a flowmeter as set forth in claim 1 wherein is provided propeller-calibrating means including a bottom plate underlying the block and secured thereto, said bottom plate having a fourth annular cavity, said block having a vertical passage connecting the inlet passageway and the outlet passageway respectively with said fourth cavity; and a needle valve carried by the bottom plate and extending into the fourth cavity and into one of said vertical passages in the block.

RAYMOND C. WEBSTER.

References Cited in the file of this patent

UNITED STATES PATENTS

| Number | Name | Date |
|---|---|---|
| 787,464 | Pascal | Apr. 18, 1905 |
| 1,585,255 | McFadden | May 18, 1926 |
| 1,624,095 | Fries | Apr. 12, 1927 |
| 2,052,794 | Petot | Sept. 1, 1936 |

FOREIGN PATENTS

| Number | Country | Date |
|---|---|---|
| 608 | Great Britain | 1856 |
| 221,915 | Great Britain | Sept. 25, 1924 |